United States Patent [19]

Barbee et al.

[11] Patent Number: 5,160,792
[45] Date of Patent: Nov. 3, 1992

[54] THERMOSETTING POWDER COATING COMPOSITIONS

[75] Inventors: Robert B. Barbee; Brian S. Phillips, both of Kingsport, Tenn.

[73] Assignee: Eastman Kodak Company, Rochester, N.Y.

[21] Appl. No.: 650,272

[22] Filed: Feb. 4, 1991

[51] Int. Cl.$^5$ .................. B32B 27/36; C08F 20/00
[52] U.S. Cl. .................... 428/480; 428/430; 428/431; 428/458; 428/482; 525/440; 525/444
[58] Field of Search ............ 428/430, 431, 458, 480, 428/482; 525/440, 444

[56] References Cited

U.S. PATENT DOCUMENTS

| | | |
|---|---|---|
| 3,822,240 | 7/1974 | Schmitt et al. ............ 260/77.5 TB |
| 3,842,021 | 10/1974 | Grant et al. ............ 260/15 |
| 4,150,211 | 4/1979 | Muller et al. ............ 528/45 |
| 4,920,008 | 4/1990 | Barbee ............ 428/458 |
| 4,957,814 | 9/1980 | Barbee et al. ............ 428/402 |
| 4,988,793 | 1/1991 | Barbee et al. ............ 528/272 |

Primary Examiner—Paul J. Thibodeau
Assistant Examiner—D. S. Nakarani
Attorney, Agent, or Firm—Bernard J. Graves, Jr.; William P. Heath, Jr.

[57] ABSTRACT

Provided are novel thermosetting powder coating compositions comprised of blends of certain amorphous polyesters, polyesters containing 1,4- and 1,3-bis(2-hydroxyethoxy)-benzene, and cross-linking agents. Coatings provided therefrom possess good gloss, impact strength, and flexibility.

12 Claims, No Drawings

THERMOSETTING POWDER COATING COMPOSITIONS

FIELD OF THE INVENTION

This invention belongs to the field of powder coatings. More particularly, this invention relates to a novel blend of polyester-based powder coating compositions.

BACKGROUND OF THE INVENTION

Plastic materials used in the manufacture of powder coatings are classified broadly as either thermosetting or thermoplastic. In the application of thermoplastic powder coatings, heat is applied to the coating on the substrate to melt the particles of the powder coating and thereby permit the particles to flow together and form a smooth coating.

Thermosetting coatings, when compared to coatings derived from thermoplastic compositions, generally are tougher, more resistant to solvents and detergents, have better adhesion to metal substrates and do not soften when exposed to elevated temperatures. However, the curing of thermosetting coatings has created problems in obtaining coatings which have, in addition to the above stated desirable characteristics, good smoothness and flexibility. Coatings prepared from thermosetting powder compositions, upon the application of heat, may cure or set prior to forming a smooth coating, resulting in a relatively rough finish referred to as an "orange peel" surface. Such a coating surface or finish lacks the gloss and luster of coatings typically obtained from thermoplastic compositions. The "orange peel" surface problem has caused thermosetting coatings to be applied from organic solvent systems which are inherently undesirable because of the environmental and safety problems occasioned by the evaporation of the solvent system. Solvent-based coating compositions also suffer from the disadvantage of relatively poor percent utilization, i.e., in some modes of application, only 60 percent or less of the solvent-based coating composition being applied contacts the article or substrate being coated. Thus, a substantial portion of solvent-based coatings can be wasted since that portion which does not contact the article or substrate being coated obviously cannot be reclaimed.

In addition to exhibiting good gloss, impact strength and resistance to solvents and chemicals, coatings derived from thermosetting coating compositions must possess good to excellent flexibility. For example, good flexibility is essential for powder coating compositions used to coat sheet (coil) steel which is destined to be formed or shaped into articles used in the manufacture of various household appliances and automobiles wherein the sheet metal is flexed or bent at various angles.

SUMMARY OF THE INVENTION

The present invention provides thermosetting powder coating compositions comprised of blends of certain amorphous polyesters and polyesters containing 1,4- and 1,3-bis(2-hydroxyethoxy)benzene, which when utilized in conjunction with a cross-linking agent such as a blocked polyisocyanate, provides coatings possessing good gloss, impact strength, and flexibility.

DETAILED DESCRIPTION OF THE INVENTION

The present invention provides a thermosetting powder coating composition which comprises an intimate blend comprising (1) a novel blend of polymers having free hydroxy groups comprised of (a) about 10 to 70 weight percent of an amorphous polyester having a glass transition temperature (Tg) of greater than 40° C., a hydroxyl number of about 20 to 200 and an inherent viscosity of about 0.1 to 0.5; and (b) about 90 to 30 weight percent of an amorphous polyester having a Tg of at least 50° C., a hydroxyl number of about 20 to 200, and an inherent viscosity of about 0.1 to 0.5; which comprises (i) diacid residues comprising at least 50 mole percent terephthalic acid residues; and (ii) diol residues comprising at least 90 mole percent of 2,2-dimethyl-1,3-propanediol and 1,4-bis(2-hydroxyethoxy)benzene residues wherein the mole ratio of 2,2-dimethyl-1,3-propanediol residues to 1,4-bis(2-hydroxyethoxy)benzene residues is about 4:1 to 0.7:1; or (iii) diol residues comprising at least 90 mole percent of 2,2-dimethyl-1,3-propanediol and 1,3-bis(2-hydroxyethoxy)benzene residues wherein the mole ratio of 2,2-dimethyl-1,3-propanediol residues to 1,3-bis(2-hydroxyethoxy)benzene residues is about 4:1 to 0:1; or a mixture of (ii) and (iii); and (2) a cross-linking effective amount of a cross-linking agent.

It will be appreciated, of course, that the sum of 1(a) and 1(b) must always equal 100%. Further, as noted above, component (1)(b) may be comprised of residues of 1,4-bis(2-hydroxyethoxy)benzene or 1,3-bis(2-hydroxyethoxy)benzene or a mixture thereof.

Both the amorphous polyester and the polyester containing 1,4- or 1,3-bis(2-hydroxyethoxy)benzene may be produced using well known polycondensation procedures. As used herein, the term "amorphous" refers to a polyester which exhibits no, or only a trace of, crystallization or melting point as determined by differential scanning calorimetry (DSC).

The preferred amorphous polyester component of the composition provided by this invention has a glass transition temperature (Tg) greater than 55° C., a hydroxyl number in the range of about 25 to 80, an acid number of not more than 15 and an inherent viscosity of about 0.15 to 0.4.

The amorphous polyesters (component (1)(a)) and (component (1)(b)) may be produced using well-known polycondensation procedures employing an excess of glycol to obtain a polymer having the specified hydroxyl number. The glycol residues of the amorphous polyester component (1)(a) may be derived from a wide variety and number of aliphatic, alicyclic and alicyclic-aromatic glycols or diols containing from 2 to about 10 carbon atoms. Examples of such glycols include ethylene glycol, propylene glycol, 1,3-propanediol, 2,4-dimethyl-2-ethylhexane-1,3-diol, 2,2-dimethyl.1,3-propanedio 2-butyl-1,3-propanediol, 2-ethyl-2-isobutyl-1,3-propanediol, 1,3-butanediol, 1,4-butanediol, 1,5-pentanediol, 1,6-hexanediol, thiodiethanol, 1,2-, 1,3-and 1,4-cyclohexanedimethanol, 2,2,4,4-tetramethyl-1,3-cyclobutanediol, 1,4-xylylenediol and the like.

The dicarboxylic acid residues of the amorphous polyester component (1)(a) may be derived from various aliphatic, alicyclic, aliphatic-alicyclic and aromatic dicarboxylic acids containing about 4 to 10 carbon atoms or ester-forming derivatives thereof such as dialkyl ester and/or anhydrides. Succinic, glutaric, adipic, azelaic, sebacic, fumaric, maleic, itaconic, 1,3- and 1,4-cyclohexanedicarboxylic, phthalic, isophthalic and terephthalic are representative of the dicarboxylic acids from which the diacid residues of the amorphous polyester may be derived. A minor amount, e.g., up to 10 mole percent, of the glycol and/or diacid residues may be replaced with branching agents, e.g., trifunctional residues derived from trimethylolethane, trimethylolpropane and trimellitic anhydride.

The preferred amorphous polyester component (1)(a) of the composition provided by this invention has a Tg greater than 55° C., a hydroxyl number in the range of about 25 to 80, an acid number of not more than 15 and an inherent viscosity of about 0.15 to 0.4. The amorphous polyester component (1)(a) preferably is comprised of (1) diacid residues of which at least 50 mole percent are terephthalic acid residues, (2) glycol residues of which at least 50 mole percent are derived from 2,2-dimethyl-1,3-propanediol (neopentyl glycol) and (3) up to 10 mole percent, based on the total moles of (2) and (3), of trimethylolpropane residues. These preferred amorphous polyesters are commercially available, e.g., under the names AZS 50 Resin, Rucote 107 and Cargill Resin 3000, and/or can be prepared according to the procedures described in U.S. Pat. Nos. 3,296,211, 3,842,021, 4,124,570 and 4,264,751 incorporated herein by reference, and Published Japanese Patent Applications (Kokai) 73-05,895 and 73-26,292. The most preferred amorphous polyester consists essentially of terephthalic acid residues, 2,2-dimethyl-1,3-propanediol residues and up to 10 mole percent, based on the total moles of 2,2-dimethyl-1,3-propanediol residues, of trimethylolpropane residues, and possesses a Tg of about 50° to 65° C., a hydroxyl number of about 35 to 60, an acid number of less than 10 and an inherent viscosity of about 0.1 to 0.25.

The preferred polyester of this invention containing 1,4- or 1,3-bis(2-hydroxyethoxy)benzene (component (1)(b)) has a Tg greater than 50° C., a hydroxyl number in the range of about 30 to 65, an acid number of not more than 10 and an inherent viscosity of about 0.10 to 0.25. The polyester component (1)(b) preferably comprises (1) diacid residues of which at least 90 mole percent are terephthalic acid residues, (2) diol residues of 2,2-dimethyl-1,3-propanediol and 1,4- or 1,3-bis(2-hydroxyethoxy)benzene in a mole ratio of 2,2-dimethyl-1,3-propanediol to 1,4- or 1,3-bis(2-hydroxyethoxy)benzene of about 4:1 to 0.7:1, preferably about 4:1 to 1:1.

Component (1)(b), in addition to the residues specified hereinabove, may contain minor amounts, e.g., up to 10 mole percent based on a total glycol residue content of 100 mole percent and a total diacid residue content of 100 mole percent, of other diacid and glycol residues such as the residues of ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,5-pentanediol, 1,6-hexanediol, thiodiethanol, 1,2-, 1,3- and 1,4-cyclohexanedimethanol, 2,2,4,4-tetramethyl-1,3-cyclobutanediol, 1,4-xylylenediol and residues of succinic, glutaric, adipic, azelaic, sebacic, fumaric, maleic, itaconic, 1,3-cyclohexanedicarboxylic, phthalic and/or isophthalic acids.

As noted above, the Tg of component 1(a) will necessarily be greater than 40° C. and the Tg of component 1(b) will be greater than 50° C. It will be appreciated by one of ordinary skill in the art of powder coatings that the upper limit for these components will be dictated only by the practicalities of application and curing. Thus, the upper limit could be as high as 150°–180° C.

The relative amounts of the amorphous polyester and the polyester containing 1,4- or 1,3-bis(2-hydroxyethoxy)benzene can be varied substantially depending on a number of factors such as the particular polyesters employed, the cross-linking agent and the amount thereof being used, the degree of pigment loading, the properties required of the coatings to be prepared from the compositions, etc. As provided above, the compositions of this invention comprise a blend of about 10 to 70 weight percent of the amorphous polyester ((1)(a)) and 30 to 90 weight percent of the polyester containing 1,4- or 1,3-bis(2-hydroxyethoxy)benzene ((1)(b)). The blend of polymers containing free hydroxy groups provided by this invention preferably is comprised of about 20 to 60 weight percent of the amorphous polyester ((1)(a)) and 40 to 80 weight percent of the polyester containing 1,4- or 1,3-bis(2-hydroxyethoxy)benzene ((1)(b)).

Suitable curing or cross-linking agents for use with hydroxyl-functional polyesters are well known in the art. Preferred cross-linking agents include the blocked isocyanates.

The blocked polyisocyanate compounds of the compositions of this invention are known compounds and can be obtained from commercial sources or may be prepared according to published procedures. Upon being heated to cure coatings of the compositions, the compounds become unblocked and the isocyanate groups react with hydroxy groups present on the amorphous polyester to cross-link the polymer chains and thus cure the compositions to form tough coatings. Examples of the blocked polyisocyanate cross-linking component include those which are based on isophorone diisocyanate blocked with ε-caprolactam, commercially available as Hüls 1530 and Cargill 2400, or toluene 2,4-diisocyanate blocked with ε-caprolactam, commercially available as Cargill 2450, and phenol-blocked hexamethylene diisocyanate.

The most readily-available, and thus the preferred, blocked polyisocyanate cross-linking agents or compounds are those commonly referred to as ε-caprolactam-blocked isophorone diisocyanate, e.g., those described in U.S. Pat. Nos. 3,822,240, 4,150,211 and 4,212,962, incorporated herein by reference. However, the products marketed as ε-caprolactam-blocked isophorone diisocyanate may consist primarily of the blocked, difunctional, monomeric isophorone diisocyanate, i.e., a mixture of the cis and trans isomers of 3-isocyanatomethyl-3,5,5-trimethylcyclohexylisocyanate, the blocked, difunctional dimer thereof, the blocked, trifunctional trimer thereof or a mixture of the monomeric, dimeric and/or trimeric forms. For example, the blocked polyisocyanate compound used as the cross-linking agent may be a mixture consisting primarily of the ε-caprolactam-blocked, difunctional, monomeric isophorone diisocyanate and the ε-caprolactam-blocked, trifunctional trimer of isophorone diisocyanate. The description herein of the cross-linking agents as "polyisocyanates" refers to compounds which contain at least two isocyanato groups which are blocked with, i.e., reacted with, another compound, e.g., ε-caprolactam. The reaction of the isocyanato groups with the blocking compound is reversible at elevated temperatures, e.g., about 150° C., and above, at which temperature the isocyanato groups are available to react with the hydroxyl groups present on the free hydroxy groups of the polyester to form urethane linkages.

The amount of the blocked diisocyanate cross-linking compound present in the compositions of this invention can be varied depending on several factors such as those mentioned hereinabove relative to the amount of components (1)(a) and (1)(b) which are utilized. Typically, the amount of cross-linking compound which will effectively cross-link the hydroxy containing polymers to produce coatings having a good combination of properties is in the range of about 5 to 30 weight percent, preferably 15 to 25 weight percent, based on the total weight of component (1)(a), component (1)(b), and the cross-linking compound.

The powder coating compositions of this invention may be prepared from the compositions described herein by dry-mixing and then melt-blending components (1)(a) and (1)(b) and the blocked polyisocyanate compound, along with other additives commonly used in powder coatings, and then grinding the solidified blend to a particle size, e.g., an average particle size in the range of about 10 to 300 microns, suitable for producing powder coatings. For example, the ingredients of the powder coating composition may be dry blended and then melt blended in a Brabender extruder at 90° to 130° C., granulated and finally ground. The melt blending should be carried out at a temperature sufficiently low to prevent the unblocking of the polyisocyanate cross-linking compound and thus avoiding premature cross-linking. To minimize the exposure of the blocked polyisocyanate to elevated temperatures, components (1)(a) and (1)(b) may be blended prior to the incorporation therein of the blocked polyisocyanate compound.

Typical of the additives which may be present in the powder coating compositions include benzoin, used to reduce entrapped air or volatiles, flow aids or flow control agents which aid the formation of a smooth, glossy surface, catalysts to promote the cross-linking reaction between the isocyanate groups of the cross-linking agent and the hydroxyl groups on the polymers, stabilizers, pigments and dyes. Although it is possible to cure or cross-link the composition without the use of a catalyst, it is usually desirable to employ a catalyst to aid the cross-linking reaction, e.g., in an amount of about 0.05 to 2.0 weight percent cross-linking catalyst based on the total weight of components (1)(a) and (1)(b) and the cross-linking agent. Suitable catalysts for promoting the cross-linking include organo-tin compounds such as dibutyltin dilaurate, dibutyltin dimaleate, dibutyltin oxide, stannous octanoate and similar compounds.

The powder coating compositions preferably contain a flow aid, also referred to as flow control or leveling agents, to enhance the surface appearance of cured coatings of the powder coating compositions. Such flow aids typically comprise acrylic polymers and are available from several suppliers, e.g., Modaflow from Monsanto Company and Acronal from BASF. Other flow control agents which may be used include Modarez MFP available from Synthron, EX 486 available from Troy Chemical, BYK 360P available from BYK Mallinkrodt and Perenol F-30-P available from Henkel. An example of one specific flow aid is an acrylic polymer having a molecular weight of about 17,000 and containing 60 mole percent 2-ethylhexyl methacrylate residues and about 40 mole percent ethyl acrylate residues. The amount of flow aid present may preferably be in the range of about 0.5 to 4.0 weight percent, based on the total weight of components (1)(a), (1)(b), and the cross-linking agent.

The powder coating compositions may be deposited on various metallic and non-metallic substrates by known techniques for powder deposition such as by means of a powder gun, by electrostatic deposition or by deposition from a fluidized bed. In fluidized bed sintering, a preheated article is immersed into a suspension of the powder coating in air. The particle size of the powder coating composition normally is in the range of 60 to 300 microns. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous, uncratered coating. The temperature of the preheated article also affects cross-linking of the coating composition and results in the formation of a tough coating having a good combination of properties. Coatings having a thickness between 200 and 500 microns may be produced by this method.

The compositions also may be applied using an electrostatic process wherein a powder coating composition having a particle size of less than 100 microns, preferably about 15 to 50 microns, is blown by means of compressed air into an applicator in which it is charged with a voltage of 30 to 100 kV by high-voltage direct current. The charged particles then are sprayed onto the grounded article to be coated to which the particles adhere due to the electrical charge thereof. The coated article is heated to melt and cure the powder particles. Coatings of 40 to 120 microns thickness may be obtained.

Another method of applying the powder coating compositions is the electrostatic fluidized bed process which is a combination of the two methods described above. For example, annular or partially annular electrodes are mounted over a fluidized bed so as to produce an electrostatic charge such as 50 to 100 kV. The article to be coated, either heated, e.g., 250° to 400° F., or cold, is exposed briefly to the fluidized powder. The coated article then can be heated to effect cross-linking if the article was not preheated to a temperature sufficiently high to cure the coating upon contact of the coating particles with the article.

The powder coating compositions of this invention may be used to coat articles of various shapes and sizes constructed of heat-resistance materials such as glass, ceramic and various metal materials. The compositions are especially useful for producing coatings on articles constructed of metals and metal alloys, particularly steel articles.

Further examples of formulation methods, additives, and methods of powder coating application may be found in *User's Guide to Powder Coating*, 2nd Ed., Emery Miller, editor, Society of Manufacturing Engineers, Dearborn, (1987).

As will be shown below, the inclusion of the above-described amorphous polyesters containing 1,4- or 1,3-bis(2-hydroxyethoxy)benzene markedly improves the flexibility of coatings prepared from the novel compositions of this invention without any significant decrease in the toughness of the coatings.

The effectiveness of this novel blend becomes apparent in the comparison of the flexibility of powder coatings formulated with (1) a blend of polymers containing free hydroxy groups comprised of 50 weight percent of an amorphous polyester and 50 weight percent of the amorphous polyester as described above containing 25 mole percent of 1,4-bis(2-hydroxyethoxy)benzene and (2) a polymer containing free hydroxy groups and containing 12.5 mole percent of 1,4-bis(2-hydroxyethoxy)benzene. Although each of the powder coatings described in (1) and (2) contain the same concentration of 1,4-bis(2-hydroxyethoxy)benzene, only the blend of (1) shows marked improvement in flexibility.

Coatings were prepared on 3 inch by 9 inch panels of 24-gauge, polished, cold roll steel, the surface of which has been zinc phosphated (Bonderite 37, The Parker Company). Impact strengths were determined using an impact tester (Gardner Laboratory, Inc.) according to ASTM D2794-84. A weight with a ⅝-inch diameter, hemispherical nose dropped within a slide tube from a specified height to drive into the front (coated face) or back of the panel. The highest impact which did not crack the coating was recorded in inch-pounds, front and reverse. The 20° and 60° gloss values were measured using a multi-angle, analog laboratory glossmeter.

The flexibility of the coatings was determined in accordance with ASTM 4145-83 at ambient temperature by bending or folding a coated panel back against itself, using a hydraulic jack pressurized at 20,000 pounds per square inch (psi), until the apex of the bend is as flat as can be reasonably achieved. This initial bend is referred to as 0 T meaning that there is nothing (zero thicknesses) between the bent portions of the panel. The bend is examined using a 10 X magnifying glass and, if fractures of the coating are observed, the panel is bent a second time (1 T) to form a three-layer sandwich. The second bend is inspected for coating fracture and this procedure is repeated, forming 4-, 5-, 6, etc. layer sandwiches, until a bend exhibits no fracture of the coating. The result of each bend test is the minimum thickness (minimum T-bend) of the bend which does not give any fractures of the coating. Although the bend test used is excessively severe for most purposes for which coated articles are used, it provides a means to compare the flexibilities of different powder coating compositions.

The pencil hardness of a coating is that of the hardest that will not cut into the coating according to ASTM 3363-74 (reapproved 1980). The results are expressed accordingly to the following scale: (softest) 6B, 5B, 4B, 3B, 2B, B, HB, F, H, 2H, 3H, 4H, 5H, 6H (hardest).

The compositions and coatings of this invention are further illustrated by the following examples. The inherent viscosities (I.V.; dl/g) referred to herein were measured at 25° C. using 0.5 g polymer per 100 mL of a solvent consisting of 60 parts by weight phenol and 40 parts by weight tetrachloroethane. Acid and hydroxyl numbers were determined by titration and are reported herein as mg of KOH consumed for each gram of polymer. The glass transition temperatures (Tg) and the melting temperatures (Tm) were determined by differential scanning calorimetery (DSC) on the second heating cycle at a scanning rate of 20° C. per minute after the sample has been heated to melt and quenched to below the Tg of the polymer. Tg values are reported as the midpoint of the transition and Tm at peaks of transitions.

EXPERIMENTAL SECTION

Example 1

A 1000 mL, 3-necked, round-bottom flask was charged with terephthalic acid (305.93 g, 1.841 mol), 2,2-dimethyl-1,3-propanediol (159.37 g, 1.530 mol), 1,4-bis(2-hydroxyethoxy)benzene (100.99 g, 0.510 mol) and butylstannoic acid (0.5 g). The contents of the flask were heated to and maintained, under nitrogen, at 200° C. for 2 hours with stirring. The temperature was then raised to 215° C. for 2 hours while distilling off water from the reaction mixture. The reaction mixture then was heated to and maintained at 235° C. for 8 hours. The molten polymer was poured into a syrup can where it was allowed to cool to a solid. The polyester thus obtained had an I.V. of 0.17, a Tg of 53° C., a hydroxyl number of 41 and an acid number of 2.

Example 2

A powder coating composition was prepared from the following materials:

747.71 g: Polyester of Example 1;
83.08 g: Rucote 107, a polyester based primarily on terephthalic acid and 2,2-dimethyl-1,3-propanediol;
169.18 g: Caprolactam-blocked isophorone polyisocyanate (Huls 1530);
5.00 g: Dibutyltin dilaurate;
10.00 g: Benzoin;
15.00 g: Modaflow III: and
400.00 g: Titanium dioxide.

The above materials were melt-blended in a ZSK-30 extruder at 110° C., ground in a Bantam mill to which a stream of liquid nitrogen was fed and classified through a 170 mesh screen on a KEK centrifugal sifter. The finely-divided, powder coating composition obtained has an average particle size of about 50 microns.

The powder coating composition prepared in Example 2 was applied electrostatically to one side of the 3 inch by 9 inch panels described above. The coatings were cured (cross-linked) by heating the coated panels at 177° C. in an oven for 25 minutes. The cured coatings were about 50 microns thick.

The coatings on the panels had both front and back impact strengths of >160 inch-pounds, 20° and 60° gloss values of 89 and 98, respectively, and a pencil hardness of F. The coated panels passed a 0.125 inch conical mandrel test and had a T-bend flexibility value of 1.

Example 3

Using the procedure described in Example 2, a powder coating composition was prepared from the following materials:

409.97 g: Polyester of Example 1;
409.97 g: Rucote 107, a polyester described in Example 2;
180.06 g: Caprolactam-blocked isophorone diisocyanate (Huls 1530);
5.00 g: Dibutyltin dilaurate;
10.00 g: Benzoin;
15.00 g: Modaflow III; and 400.00 g: Titanium dioxide.

Using the procedure of Example 2, panels were coated with this powder coating composition and the coatings were cured and evaluated. The coatings had both front and back impact strengths of >160 inch-pounds and 20° and 60° gloss values of 89 and 97, respectively, and a pencil hardness of F. The coated panels passed a 0.125 inch conical mandrel and had a T-bend flexibility value of 1.

Example 4

Using the procedure described in Example 2, a powder coating composition was prepared from the following materials:
326.90 g: Polyester of Example 1;
490.36 g: Rucote 107, a polyester described in Example 2;
182.79 g: Caprolactam-blocked isophorone diisocyanate (Huls 1530);
6.00 g: Dibutyltin dilaurate;
10.00 g: Benzoin;
15.00 g: Modaflow III:
400.00 g: Titanium dioxide.

Using the procedure of Example 2, panels were coated with this powder coating composition and the coatings were cured and evaluated. The coatings had both front and back impact strengths of >160 inch-pounds and 20° and 60° gloss values of 88 and 96, respectively, and a pencil hardness of F. The coated panels passed a 0.125 inch conical mandrel and had a T-bend flexibility value of 1.

Example 5

Using the procedure described in Example 2, a powder coating composition was prepared from the following materials;
244.38 g: Polyester of Example 1;
570.22 g: Rucote 107, a polyester described in Example 2;
185.40 g: Caprolactam-blocked isophorone diisocyanate (Huls 1530);
7.00 g: Dibutyltin dilaurate;
10.00 g: Benzoin;
15.00 g: Modaflow III;
400.00 g: Titanium dioxide.

Using the procedure of Example 2, panels were coated with this powder coating composition and the coatings were cured and evaluated. The coatings had both front and back strengths of >160 inch-pounds and 20° and 60° gloss values of 88 and 96, respectively, and a pencil hardness of F. The coated panels passed a 0.125 inch conical mandrel and had a T-bend flexibility value of 2.

Example 6

A 2000 mL, 3-necked, round-bottom flask was charged with terephthalic acid (555.20 g, 3.341 mol), 2,2-dimethyl-1,3-propanediol (194.80 g, 1.873 mol), 1,4-bis(2-hydroxyethoxy)benzene (370.30 g, 1.868 mol) and butylstannoic acid (1.0 g). The contents of the flask were heated to and maintained, under nitrogen, at 200° C. for two hours with stirring. The temperature then was raised to 215° C. for two hours while distilling off water from the reaction mixture. The reaction mixture then was heated to and maintained at 235° C. for 8 hours. The molten polymer was poured into a syrup can where it was allowed to cool to a solid. The polyester thus obtained had an I.V. of 0.17, a Tg of 54° C., a hydroxyl number of 32 and an acid number of 1.

Example 7

Using the procedure described in Example 2, a powder coating composition was prepared from the following materials:
416.79 g: Polyester of Example 6;
416,79 g: Rucote 107, a polyester described in Example 2;
166.42 g: Caprolactam-blocked isophorone diisocyanate (Huls 1530);
5.00 g: Dibutyltin dilaurate;
10.00 g: Benzoin;
15.00 g: Modaflow III;
400.00 g: Titanium dioxide.

Using the procedure of Example 2, panels were coated with this powder coating composition and the coatings were cured and evaluated. The coatings had both front and back impact strengths of >160 inch-pounds and 20° and 60° gloss values of 80 and 99, respectively, and a pencil hardness of F. The coated panels passed a 0.125 inch conical mandrel and had a T-bend flexibility value of 1.

Comparative Example 1

A powder coating composition was prepared from the following materials:
816.60 g: Rucote 107, a polyester described in Example 2;
183.40 g: Caprolactam-blocked isophorone diisocyanate (Huls 1530);
10.00 g: Dibutyltin dilaurate;
10.00 g: Benzoin;
15.00 g: Modaflow III;
400.00 g: Titanium dioxide.

Using the procedure of Example 2, panels were coated with this powder coating composition and the coatings were cured and evaluated. The coatings had both front and back impact strengths of >160 inch-pounds and 20° and 60° gloss values of 85 and 95, respectively, and a pencil hardness of H. The coated panels passed a 0.125 inch conical mandrel and had a T-bend flexibility value of 6.

Comparative Example 2

A 1000 mL, 3-necked, round-bottom flask was charged with terephthalic acid (322.07 g, 1.939 mol), 2,2-dimethyl-1,3-propanediol (194.81 g, 1.870 mol), 1,4-bis(2-hydroxyethoxy)benzene (52.90 g, 0.267 mol) and butylstannoic acid (0.5 g). The contents of the flask where reacted, polymerized and isolated according to the procedure described in Example 1. The polyester thus obtained had an I.V. of 0.15, a Tg of 55° C., a hydroxyl number of 49 and an acid number of 10.

Comparative Example 3

A powder coating composition was prepared from the following materials:
803.49 g: Polyester prepared as described in Comparative Example 2;
196.51 g: Caprolactam-blocked isophorone diisocyanate (Huls 1530);
10.00 g: Dibutyltin dilaurate;
10.00 g: Benzoin;
15.00 g: Modaflow III;
400.00 g: Titanium dioxide.

Using the procedure of Example 2, panels were coated with this powder coating composition and the coatings were cured and evaluated. The coatings had both front and back impact strengths of <160 inch-pounds and 20° and 60° gloss values of 80 and 93, respectively, and a pencil hardness of H. The coated panels passed a 0.125 inch conical mandrel and had a T-bend flexibility value of 6.

We claim:

1. A thermosetting powder coating composition which comprises an intimate blend comprising
   (1) a blend of polymers having free hydroxy groups comprised of
      (a) about 10 to 70 weight percent of an amorphous polyester having a glass transition temperature (Tg) of greater than 40° C., a hydroxyl number of about 20 to 200 and an inherent viscosity of about 0.1 to 0.5; said amorphous polyester comprised of diol and dicarboxylic acid residues, said diol residues selected from a group consisting of residues of ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,3-butanediol, 1,5-pentanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, and 1,4-xylylenediol; and
      (b) about 90 to 30 weight percent of an amorphous polyester having a Tg of at least 50° C., a hydroxyl number of about 20 to 200, and an inherent viscosity of about 0.1 to 0.5 which comprises
         (i) diacid residues comprising at least 50 mole percent terephthalic acid residues; and
         (ii) diol residues comprising at least 90 mole percent of 2,2-dimethyl-1,3-propanediol and 1,4-bis(2-hydroxyethoxy)benzene residues wherein the mole ratio of 2,2-dimethyl-1,3-propanediol residues to 1,4-bis(2-hydroxyethoxy)benzene residues is about 4:1 to 0.7:1; or
         (iii) diol residues comprising at least 90 mole percent of 2,2-dimethyl-1,2-propanediol and 1,3-bis(2-hydroxyethoxy)benzene residues wherein the mole ratio of 2,2-dimethyl-1,3-propanediol residues to 1,3-bis(2-hydroxyethoxy)benzene residues is about 4:1 to 0.7:1; or a mixture of (ii) and (iii); and
   (2) a cross-linking effective amount of a cross-linking agent.

2. The composition of claim 1 wherein component (1)(b) comprises
   (i) diacid residues comprising at least 90 mole percent of terephthalic acid residues; and
   (ii) diol residues comprsied of residues of 2,2-dimethyl-1,3-propanediol and 1,4- or 1,3-bis(2-hydroxyethoxy)benzene in a molar ratio of about 4:1 to 1:1.

3. The composition of claim 1 wherein the cross-linking agent is a blocked polyisocyanate.

4. The composition of claim 3 wherein the blocked polyisocyanate is ε-caprolactam-blocked toluene-2,4-diisocyanate, ε-caprolactam-blocked isophorone diisocyanate, or phenol-blocked hexamethylene diisocyanate.

5. A composition of claim 4, further comprising one or more cross-linking catalysts.

6. A thermosetting powder coating composition which comprises an intimate blend comprising
   (1) a blend of polymers having free hydroxy groups comprised of
      (a) about 20 to 60 weight percent of an amorphous polyester having a glass transition temperature (Tg) of greater than 40° C., a hydroxyl number of about 20 to 200 and an inherent viscosity of about 0.1 to 0.5; said amorphous polyester comprised of diol and dicarboxylic acid residues, said diol residues selected from a group consisting of residues of ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,3-butanediol, 1,5-pentanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, and 1,4-xylylenediol; and
      (b) about 80 to 40 weight percent of an amorphous polyester having a Tg of at least 50° C., a hydroxyl number of about 20 to 200, and an inherent viscosity of about 0.1 to 0.5 which comprises
         (i) diacid residues comprising at least 50 mole percent terephthalic acid residues; and
         (ii) diol residues comprising at least 90 mole percent of 2,2-dimethyl-1,3-propanediol and 1,4-bis(2-hydroxyethoxy)benzene residues wherein the mole ratio of 2,2-dimethyl-1,3-propanediol residues to 1,4-bis(2-hydroxyethoxy)benzene residues is about 4,1to 0.7:1; or
         (iii) diol residues comprising at least 90 mole percent of 2,2-dimethyl-1,3-propanediol and 1,3-bis(2-hydroxyethoxy)benzene residues wherein the mole ratio of 2,2-dimethyl-1,3-propanediol residues to 1,3-bis(2-hydroxyethoxy)benzene residues is about 4:1 to 0.7:1; or a mixture of (ii) and (iii); and
   (2) a cross-linking effective amount of cross-linking agent.

7. The composition of claim 6 wherein component (1)(b) comprises
   (i) diacid residues comprising at least 90 mole percent of terephthalic acid residues; and
   (ii) diol residues comprised of residues of 2,2-dimethyl-1,3-propanediol and 1,4- or 1,3-bis(2-hydroxyethoxy)benzene in a molar ratio of about 4:1 to 1:1.

8. The composition of claim 6 wherein the cross-linking agent is a blocked polyisocyanate.

9. The composition of claim 8 wherein the blocked polyisocyanate is ε-caprolactam-blocked toluene-2,4-diisocyanate, ε-caprolactam-blocked isophorone diisocyanate, or phenol-blocked hexamethylene diisocyanate.

10. A composition of claim 9, further comprising one or more cross-linking catalysts.

11. An article coated with the cured powder coating composition of claim 1.

12. An article coated with the cured powder coating composition of claim 6.